(12) United States Patent
Masuko et al.

(10) Patent No.: US 9,245,293 B2
(45) Date of Patent: Jan. 26, 2016

(54) GOODS AND SERVICES PURCHASE SUPPORTING APPARATUS, METHOD AND INFORMATION STORAGE MEDIUM

(71) Applicant: RAKUTEN, INC., Shinagawa-ku, Tokyo (JP)

(72) Inventors: Soh Masuko, Shinagawa-ku (JP); Shigaku Iwabuchi, Tsukuba (JP); Shinichiro Tosa, Ichikawa (JP); Jiro Tanaka, Ushiku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/044,955

(22) Filed: Oct. 3, 2013

(65) Prior Publication Data
US 2014/0304119 A1    Oct. 9, 2014

(30) Foreign Application Priority Data
Apr. 4, 2013    (JP) .................................. 2013-078629

(51) Int. Cl.
*G06Q 30/00* (2012.01)
*G06Q 30/06* (2012.01)
(52) U.S. Cl.
CPC .................................. *G06Q 30/0641* (2013.01)
(58) Field of Classification Search
CPC .......... G06Q 30/0249; G06Q 30/0251; G06Q 30/0241; G06T 19/006; G06T 2210/16
USPC ........................ 705/27.1, 27.2, 26.1; 345/633
See application file for complete search history.

(56) References Cited

U.S. PATENT DOCUMENTS
2013/0085345 A1*    4/2013   Geisner et al. ................ 600/300

FOREIGN PATENT DOCUMENTS
JP    2001-338351 A    12/2001
JP    2012174236 A    9/2012

OTHER PUBLICATIONS

Japanese Office Action issued in Application No. 2013-078629 dated Nov. 27, 2013.
D.Quick, "IBM brings augmented reality to the shopping aisle" (online), Jul. 3, 2013 URL: http://www.gizmag.com/ibm-augmented-reality-shopping-app/23165/.

* cited by examiner

*Primary Examiner* — Courtney Stopp
(74) *Attorney, Agent, or Firm* — Sughrue Mion, PLLC (57) ABSTRACT

The goods and services purchase supporting apparatus includes an identification information acquiring unit (30) to acquire an image of a medium on which a marker indicative of identification information of goods or services is presented, the medium being presented to a customer in association with the goods or the services, and acquire the identification information from the marker represented on the acquired image of the medium, a discount information acquiring unit (34) to acquire, from a storing unit (32) to store discount information applicable to the goods or the services in association with the identification information of the goods or the services, the discount information that is associated with the identification information acquired by the identification information acquiring unit, and an arranging unit (36) to arrange display information, which is based on the discount information acquired by the discount information acquiring unit, with the image of the medium.

5 Claims, 8 Drawing Sheets

| ITEM ID | PRICE BEFORE DISCOUNT | PRICE AFTER DISCOUNT |
|---|---|---|
| 0001 | ¥3,980 | ¥2,480 |
| 0002 | ¥1,980 | ¥1,480 |

GOODS AND SERVICES PURCHASE SUPPORTING APPARATUS, METHOD AND INFORMATION STORAGE MEDIUM

CROSS-REFERENCE TO RELATED APPLICATION

The present application claims priority from Japanese application JP2013-078629 filed on Apr. 4, 2013, the content of which is hereby incorporated by reference into this application.

BACKGROUND OF THE INVENTION

1. Field of the Invention

The present invention relates to a goods and services purchase supporting apparatus, a method thereof, and an information storage medium.

2. Description of the Related Art

It has been known to print out a web coupon provided on a store's web page and bring the printed coupon to the store to make use of services, such as discount prices for the goods and offers of food and beverage. Using such a system, it is possible to guide the viewers of the web page to the store. JP2001-338351A discloses an electronic coupon issuing system in which a customer can receive a discount on goods using an electronic coupon registered beforehand in association with an electronic coupon usage medium, such as a credit card, by simply presenting the electronic coupon medium. In this manner, it is possible to omit a step of printing out a coupon and bringing it to a store.

SUMMARY OF THE INVENTION

However, a conventional manner of using coupons is such that a consumer presents a printed web coupon or an equivalent medium at the time of payment, and thus there is a problem that, when selecting goods or services, the consumer has no way to know specific goods or services for which the coupon is valid or an extent of discount receivable with the coupon. As such, in the conventional system, there is a problem that it is difficult to convince the consumer to buy goods or services inside the store.

One or more embodiments of the present invention have been conceived in view of the above, and an object thereof is to provide a goods and services purchase supporting apparatus, a method thereof, and an information storage medium for allowing a consumer to easily know discount information when selecting goods or services in a store.

In order to solve the above described problems, a goods and services purchase supporting apparatus according to an embodiment of the present invention includes an identification information acquiring unit configured to acquire an image of a medium on which a marker indicative of identification information of goods or services is presented, the medium being presented to a customer in association with the goods or the services, and acquire the identification information from the marker represented on the acquired image of the medium, a discount information acquiring unit configured to acquire, from a storing unit configured to store discount information applicable to the goods or the services in association with the identification information of the goods or the services, the discount information that is associated with the identification information acquired by the identification information acquiring unit, and an arranging unit configured to arrange display information, which is based on the discount information acquired by the discount information acquiring unit, with the image of the medium.

The arranging unit may arrange the display information with the image of the medium at a position corresponding to the marker.

The medium may represent the marker and a price before discount of the goods or the services. The display information may be information indicative of a price after discount based on the discount information. The arranging unit may arrange information indicative of the price after discount on an area of the image of the medium, the area formerly presenting the price before discount.

The arranging unit may arrange an animation that shows the price before discount changing into the price after discount in the area presenting the price before discount.

The arranging unit may include representation difference determination unit configured to determine a difference between a representation of the price before discount represented on the image of the medium and a representation of the price after discount. The arranging unit may selectively arrange information indicative of the price after discount on a portion of the representation of the price before discount, the portion being related to the difference.

The discount information may be determined according to a purchase record of the goods or the services to which the discount information is applied.

A goods and services purchase supporting method according to the embodiment of the present invention includes the steps of acquiring an image of a medium on which a marker indicative of identification information of goods or services is presented, the medium being presented to a customer in association with the goods or the services, and acquiring the identification information from the marker represented on the acquired image of the medium; acquiring, from a storing unit configured to store discount information applicable to the goods or the services in association with the identification information of the goods or the services, the discount information that is associated with the identification information acquired in the step of acquiring the identification information; and arranging display information, which is based on the discount information acquired in the step of acquiring the discount information, with the image of the medium.

A program according to the embodiment of the present invention causes a computer to function as an identification information acquiring unit configured to acquire an image of a medium on which a marker indicative of identification information of goods or services is presented, the medium being presented to a customer in association with the goods or the services, and acquire the identification information from the marker represented on the acquired image of the medium; a discount information acquiring unit configured to acquire, from a storing unit configured to store discount information applicable to the goods or the services in association with the identification information of the goods or the services, the discount information that is associated with the identification information acquired by the identification information acquiring unit; and an arranging unit configured to arrange display information, which is based on the discount information acquired by the discount information acquiring unit, with the image of the medium. The program may be stored in a computer-readable information storage medium such as a CD-ROM and a DVD-ROM.

DETAILED DESCRIPTION OF THE INVENTION

An embodiment of the present invention will be described below in detail with reference to the accompanying drawings.

Figure 1:
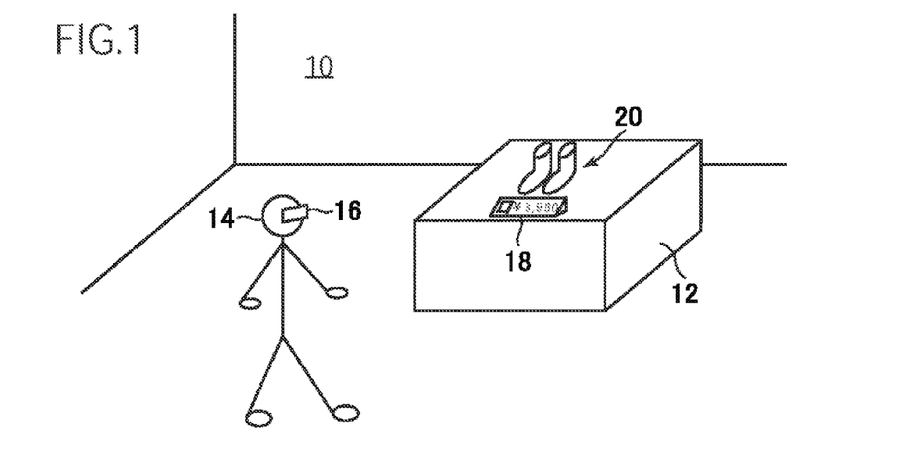
FIG. 1 is a diagram illustrating a goods purchase supporting system according to an embodiment of the present invention.
Figure 2:
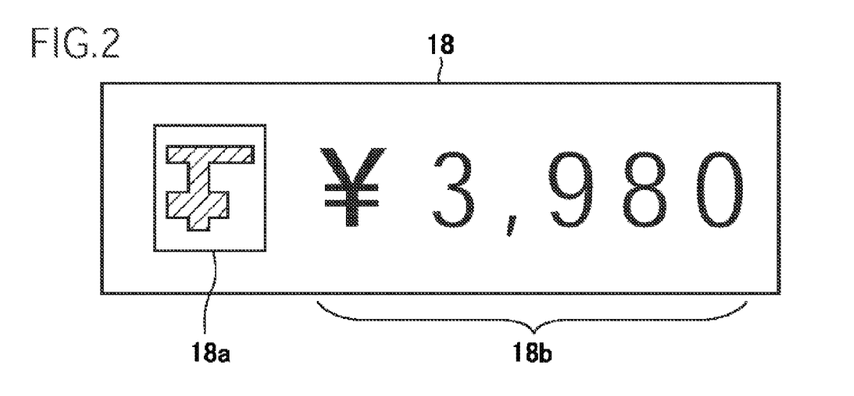
FIG. 2 is a diagram illustrating an example of a price tag.

FIG. 1 is a perspective view illustrating a scene in which a goods purchase supporting system according to an embodiment of the present invention is used. As shown in FIG. 1, the goods purchase supporting system is used in an actual store 10 where a variety of items are displayed and sold. In the actual store 10, an item 20 is placed on a display table 12 together with a price tag 18. A customer 14 looks around the actual store 10 through the goods purchase supporting apparatus 16 including a HMD (Head Mounted Display), for example. That is, the goods purchase supporting apparatus 16 includes imaging means and display means, and the display means displays a view in front of the customer. The view is acquired by the imaging means. The customer 14 looks at an image displayed by the display means. When the customer 14 comes to a position in front of a price tag 18, the display means displays an image of the price tag. As shown in FIG. 2, the price tag 18 is a medium such as paper, and has an AR marker (sign) 18a and a price before discount 18b. The AR marker 18a has a predetermined shape and size with a 2D code image depicted inside. Based on the position, shape, and size of the AR marker 18a in the captured image, the goods purchase supporting apparatus 16 can determine the position and direction of the price tag 18. The goods purchase supporting apparatus 16 also reads out an item ID (identification information) by decoding the 2D image code image depicted in the AR marker 18a. Further, the price before discount 18b is displayed in a predetermined position relative to the AR marker 18a. That is, each number constituting the price before discount 18b is placed in a predetermined position relative to the AR marker 18a. As such, it is possible to specify the positions of the numbers constituting the price before discount 18b based on the position of the AR marker 18a.

Figure 3:
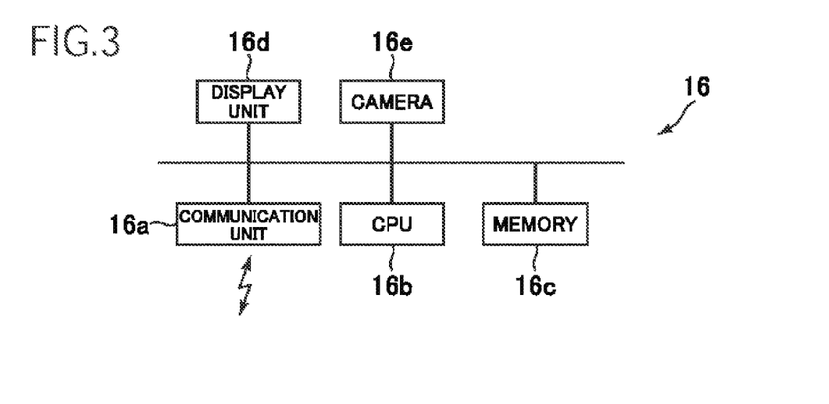
FIG. 3 is a diagram illustrating a hardware structure of the goods purchase supporting apparatus.

FIG. 3 is a diagram showing a hardware structure of the goods purchase supporting apparatus 16. As shown in FIG. 3, the goods purchase supporting apparatus 16 is a computer including a communication unit 16a, a CPU 16b, a memory 16c, a display 16d, and a camera 16e. These hardware elements are connected and capable of transferring data each other via a bus. The communication unit 16a is a device for data communication with a server 21 (see FIG. 6) via wireless communication such as a wireless LAN. The CPU 16b controls each portion of the apparatus and executes various kinds of information processing. The memory 16c stores various kinds of programs and data. The memory 16c secures a work area of the CPU 16b. Here, the display 16d has a so-called HMD shape that is attached to the head of the customer 14 to set a small display in front of the customer's eyes. The camera 16e is coupled to the HMD so that the camera 16e captures a view in a viewing direction of the customer 14 in a state where the customer 14 properly wears the display 16d, which is the HMD. The camera 16e sequentially captures views in front of the customer 14 in a predetermined frame rate, and the display 16d sequentially displays the captured images. In this way, the customer 14 can see the scene ahead through the display 16d in real time. The hardware elements other than the display 16d may be integrated with the display 16d. Alternatively, the hardware elements other than the display 16d may be formed separately from the display 16d, and connected to the display 16d via a cable or BLUETOOTH (registered trademark), for example. The display 16d is a HMD in this case, but the entire goods purchase supporting apparatus 16 may be formed in a shape of a tablet in various sizes. In this case, the display 16d is a FPD (Flat Panel Display) such as a liquid crystal panel or an organic EL panel. The camera 16e is provided to the back side of the display 16d. When the customer 14 directs the back side of the display 16d to a target, an image of the target is displayed on the display 16d.

Figure 4:
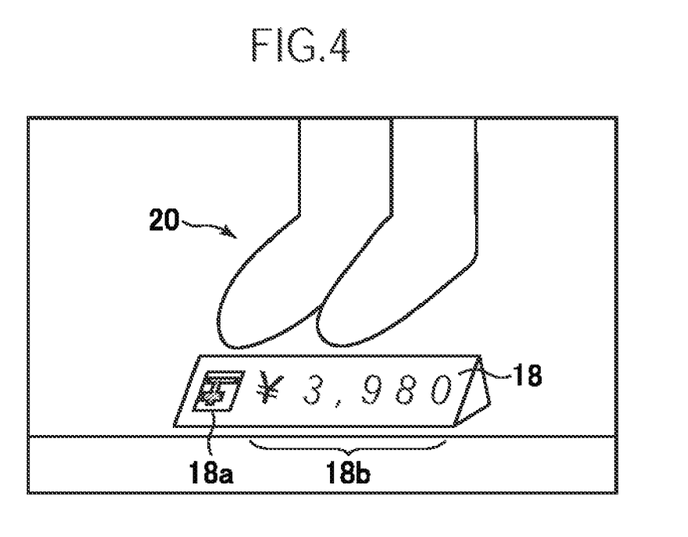
FIG. 4 is a diagram illustrating an example of an image captured by a camera.
Figure 5:
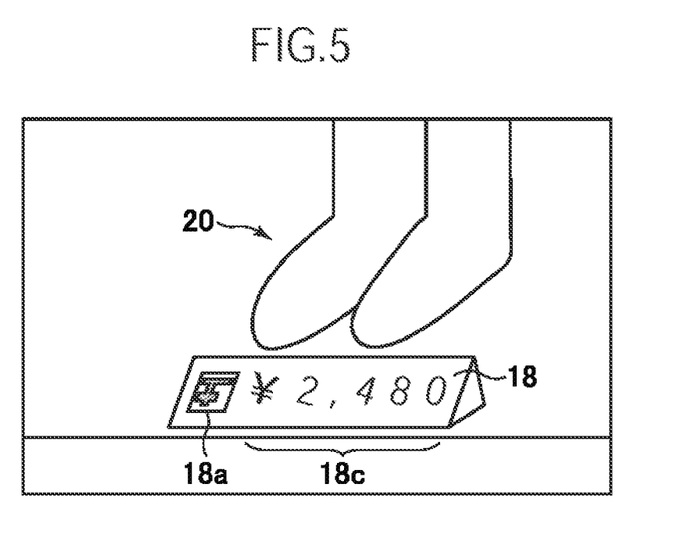
FIG. 5 is a diagram illustrating an example of the changed image to be displayed by the goods purchase supporting apparatus.

FIG. 4 is a diagram illustrating an example of an image captured by the camera 16e. This image constitutes a moving picture captured by the camera 16e. In this case, the item 20 and the price tag 18 are shown. In the goods purchase supporting system according to this embodiment, when a customer 14 has a coupon, content of the price tag 18 is changed using AR technology, and presented to the customer 14. FIG. 5 illustrates an example of an image displayed by the display 16d of the goods purchase supporting apparatus 16. The image shown in FIG. 5 is obtained by changing the image shown in FIG. 4. When comparing FIGS. 4 and 5, FIG. 4 shows that the price tag 18 indicates a price before discount 18b "JPY3,980", while FIG. 5 shows that the price tag 18 indicates a price after discount 18c "JPY2,480." Upon acquiring the image shown in FIG. 4, the goods purchase supporting apparatus 16 locates an area of the price before discount 18b based on the AR marker 18a, and arranges the price after discount 18c in the area. The image is changed in this way only when the customer has an applicable coupon. With this, the customer 14 can immediately know which item he/she can purchase at which price by just seeing the price tag 18 through the display 16d of the goods purchase supporting apparatus 16. In this way, it is possible to increase the customer's desire to buy the item. In addition, a customer who does not use the goods purchase supporting apparatus 16 and a customer who does not have a coupon recognize only the price before discount 18*b*, and thus, it is possible to sell the item 20 at different prices depending on the customers.

Figure 6:
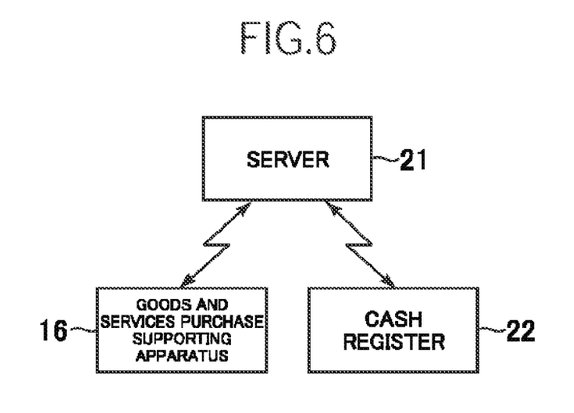
FIG. 6 is a diagram illustrating the overall configuration of the goods purchase supporting system.

In the following, the processing of the goods purchase supporting system will be explained in further detail. FIG. 6 is a diagram illustrating the overall configuration of the goods purchase supporting system. The goods purchase supporting system includes the goods purchase supporting apparatus 16, the server 21 and a cash register 22. The goods purchase supporting apparatus 16 and the cash register 22 are both able to communicate with the server 21. As explained above, the goods purchase supporting apparatus 16 is a computer carried by the customer 14. The server 21 is a computer for managing the sales of items or the coupons (discount information). The cash register 22 includes a computer, and transmits to the server 21 information on which customer has purchased which item.

Figure 7:
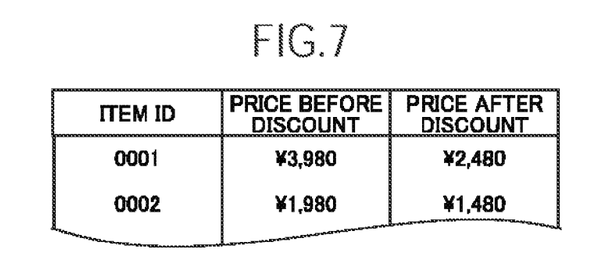
FIG. 7 is a diagram illustrating content of a coupon table.

FIG. 7 is a diagram schematically illustrating an example of a coupon table stored in the server 21 and the goods purchase supporting apparatus 16. The server 21 stores a coupon table in association with corresponding customer 14. On the other hand, the goods purchase supporting apparatus 16 receives from the server 21, using the communication unit 16*a*, the coupon table associated with the customer 14 who uses the goods purchase supporting apparatus 16, and stores the received coupon table in the memory 16*c*. The coupon table indicates content of a coupon owned by each customer 14 and includes information on what item is offered in what rate of discount by the coupon. As shown in FIG. 7, the coupon table stores an item ID of an item to which the coupon is applied, a price before discount of the item, and a price after discount of the item, in association with one another. In this case, the price before discount is a price of an item before the coupon is applied, and the price after discount is a price of an item after the coupon is applied. All of the customers may have the same coupon or different coupons. In addition, even though the coupons are intended for the same item, the prices after discount may differ depending on the customers.

Figure 8:
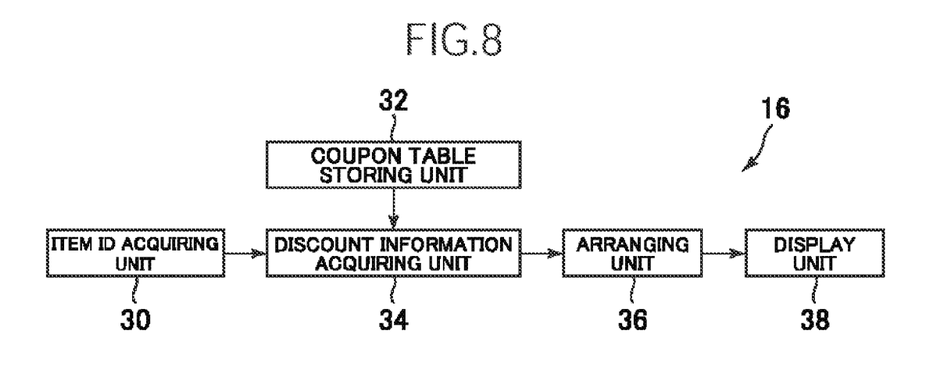
FIG. 8 is a functional block diagram of the goods purchase supporting apparatus.

FIG. 8 is a functional block diagram of the goods purchase supporting apparatus 16. As shown in FIG. 8, the goods purchase supporting apparatus 16 functionally includes an item ID acquiring unit 30, a coupon table storing unit 32, a discount information acquiring unit 34, an arranging unit 36, and a display unit 38. These elements are implemented by a program stored in the memory 16*c* and executed by the CPU 16*b*. This program may be installed from a computer readable information storage medium, such as a CD-ROM, a DVD-ROM, and a memory card into the goods purchase supporting apparatus 16, or downloaded from a communication network such as the Internet.

The item ID acquiring unit 30 acquires, from the camera 16*e*, an image of the price tag 18 presented to the customer 14 in association with the item 20. Subsequently, the item ID acquiring unit 30 acquires an item ID of the item 20 from an AR marker 18*a* presented in the acquired image of the price tag 18. The coupon table storing unit 32 includes the memory 16*c*, and stores the coupon table downloaded from the server 21. As mentioned above, the coupon table stores the price before discount and the price after discount in association with the item ID, and is downloaded from the server 21.

The discount information acquiring unit 34 accesses the coupon table and acquires the price after discount associated with the item ID acquired by the item ID acquiring unit 30. The arranging unit 36 arranges the price after discount acquired by the discount information acquiring unit 34 with the image of the price tag 18 acquired by the camera 16*e*. The display unit 38 displays the image acquired in this way on the display 16*d*.

Figure 9:
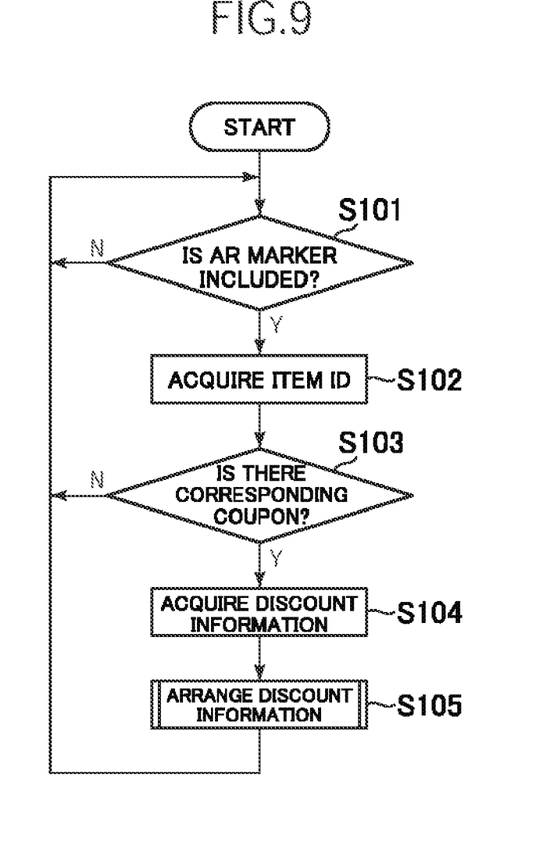
FIG. 9 is an operational flow diagram of the goods purchase supporting apparatus.

FIG. 9 is an operational flow diagram of the goods purchase supporting apparatus 16. As shown in FIG. 9, the goods purchase supporting apparatus 16 monitors, using the item ID acquiring unit 30, whether or not a frame image acquired by the camera 16*e* includes an AR marker 18*a* (S101). If the frame image includes an AR marker 18*a*, the goods purchase supporting apparatus 16 decodes an image of the AR marker 18*a* to read out an item ID (S102). Subsequently, the discount information acquiring unit 34 determines whether or not the item ID read out in S102 is stored in the coupon table (S103). If the item ID is not stored in the coupon table, the customer 14 does not have a coupon corresponding to the item 20 in front of the customer 14, and the process returns to S101.

If the item ID read out in S102 is stored in the coupon table, the discount information acquiring unit 34 reads out a price after discount stored in association with the item ID from the coupon table (S104). Subsequently, the arranging unit 36 arranges the price after discount read out from the coupon table together with the image of the price tag 18 acquired by the camera 16*e* (S205). The display unit 38 then displays the acquired image on the display 16*d*, and the process returns to S101.

Figure 10:
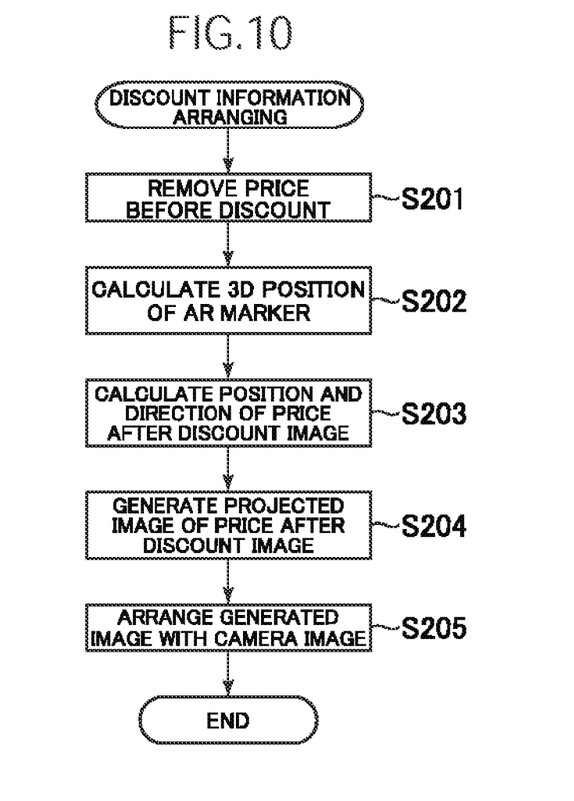
FIG. 10 is a flow chart showing discount information arrangement processing.
Figure 11:
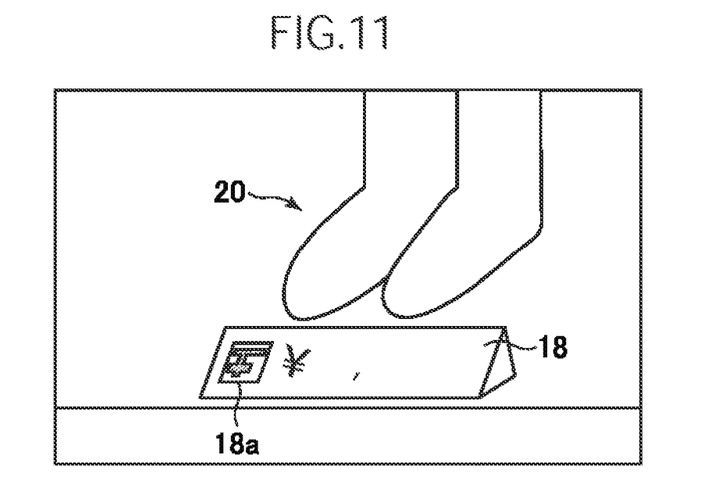
FIG. 11 is a diagram illustrating an image with the price before discount being removed.

FIG. 10 is a flow chart showing in detail discount information arrangement processing of S105. As shown in FIG. 10, the arranging unit 36 removes a price before discount 18*b* from the frame image acquired by the camera 16*e* (S201). FIG. 11 illustrates an image obtained by removing the price before discount 18*b* from the frame image shown in FIG. 4. Specifically, the arranging unit 36 recognizes a position of the AR marker 18*a* in the frame image, and locates an area of the price before discount 18*b* placed in a predetermined position relative to the recognized position. In the located area, the arranging unit 36 looks for pixels added with a predetermined color (in this case, black) indicating figures of the price before discount 18*b*, and changes the color of the pixels into a background color (in this case, white). In this way, it is possible to remove the price before discount 18*b* from the frame image shown in FIG. 4.

Figure 12A:
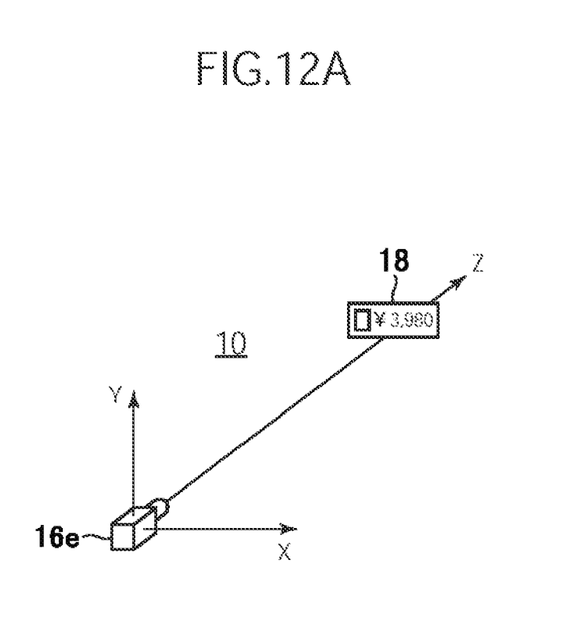
FIG. 12A is a diagram explaining AR (Augmented Reality) processing.

Next, the arranging unit 36 calculates a position and a direction of the AR marker 18*a* (S202). As shown in FIG. 12(*a*), the arranging unit 36 sets a viewing point coordinate system having a position of an image pickup element integrated in the camera 16*e* as an origin, the front direction of the image pickup element as the Z direction, the upward direction of the image pickup element as the Y direction, and the rightward direction of the image pickup element as the X direction. The arranging unit 36 calculates the position of the AR marker 18*a* in the coordinate system. The AR marker 18*a* is presented in a smaller size in the frame image as a distance between the AR marker 18 and the camera 16*e* becomes larger. Further, the AR marker 18*a* is presented at a position farther from the center of the frame image as the AR marker 18*a* is located farther from the front direction of the camera 16*e*. In addition, the AR marker 18*a* is more significantly deformed in the frame image as the AR marker 18*a* becomes oblique to the front direction of the camera 16*e*. In the above, the arranging unit 36 calculates the position and the direction (normal direction) of the AR marker 18*a* in the viewing point coordinate system based on the positions of four corners of the AR marker 18*a* in the frame image.

The arranging unit 36 calculates the position and the direction of images of respective figures constituting the price after discount 18*c* based on the position and the direction of the AR marker 18*a* (S203). Specifically, as explained above, each figure of the price before discount 18*b* relative to the AR marker 18*a* is placed in a predetermined position on the price tag 18, and thus the arranging unit 36 can calculate the position and the direction of each figure in the viewing point coordinate system.

Figure 12B:
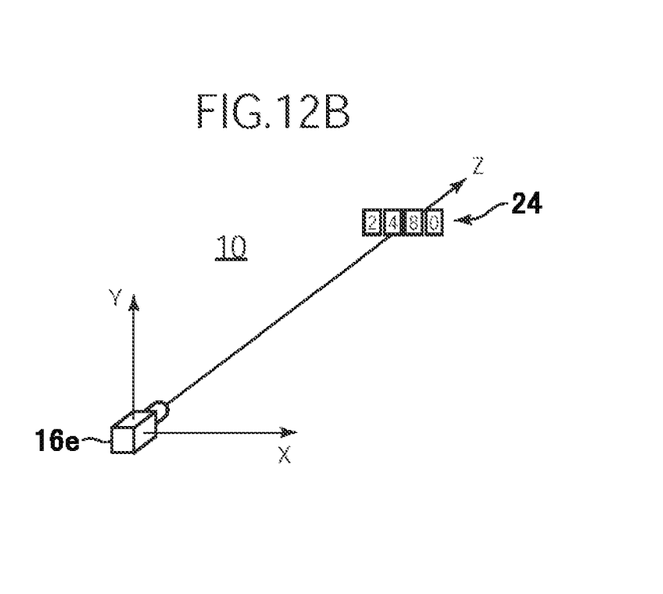
FIG. 12B is a diagram illustrating the projection of a discounted price via AR processing.

Subsequently, as shown in FIG. 12(b), the arranging unit 36 places objects having images representative of each figure of the price after discount 18c mapped thereon as a texture on the positions calculated in the space of the viewing point coordinate system in S203. These objects are placed in the direction calculated in S203. The arranging unit 36 then generates an image by projecting these objects on a surface of the image pickup element of the camera 16e (S204). This processing can be implemented by well-known known 3D graphics techniques. Then, the arranging unit 36 arranges the image generated in S204 together with the frame image acquired by the camera 16e (S205). In this way, as shown in FIG. 5, the arranging unit 36 can generate the frame image presenting the price after discount 18c instead of the price before discount 18b.

In many cases, the price before discount 18b and the price after discount 18c partially have the same representation of the prices. For example, in FIGS. 4 and 5, the price before discount 18b "JPY3,980" and the price after discount 18c "JPY2,480" have the same last two figures and different first two figures. As such, the following modified processing may be executed. The discount information acquiring unit 34 reads out the price before discount and the price after discount, which are associated with the item ID acquired by the acquiring unit 30, from the coupon table, and the arranging unit 36 then determines the differences between the representations of the prices. In the processing in S201, the first two figures of the price before discount 18b, are removed. Further, in the processing of S203 and S204, the position and the direction of the area relating to the differences are calculated, and the figures of the price after discount 18c are arranged. In this way, it is possible to present an image that has a smaller, more natural looking arrangement to the customer 14.

As explained above, according to the goods purchase supporting system of this embodiment, the customer 14 can immediately know which item he can purchase at which price by just seeing the price tag 18 through the display 16d of the goods purchase supporting apparatus 16. In this way, it is possible to increase the customer 14's desire to buy the item. In addition, a customer who does not use the goods purchase supporting apparatus 16 and a customer who does not have a coupon recognize only the price before discount 18b, and thus it is possible to sell the item 20 at different prices depending on the customers.

The present invention is not to be limited to the above described embodiment. For example, all or some of the functions of the goods purchase supporting apparatus 16 may be provided in the server 21. In this case, the server 21 alone or a combination of the server 21 and the goods purchase supporting apparatus 16 correspond to the goods and services purchase supporting apparatus according to the present invention. For example, in the functional block diagram of FIG. 8, the coupon table storing unit 32 and the discount information acquiring unit 34 may be provided in the server 21.

Figure 13:
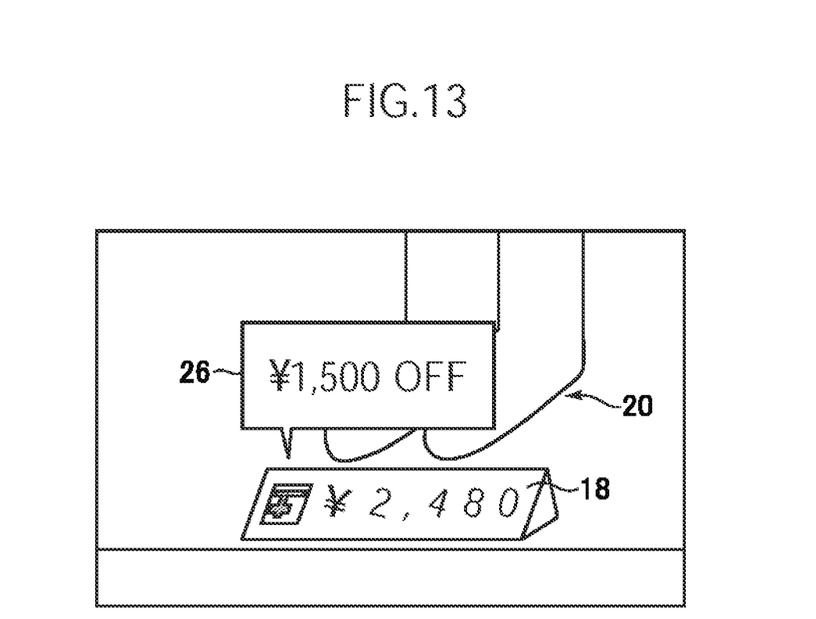
FIG. 13 is a diagram illustrating another example of the changed image.

The frame image acquired by the camera 16e may be arranged with an image other than the price after discount 18c. For example as shown in FIG. 13, a virtual object 26 indicative of an discount amount may be placed around the price tag 18, and an image of the discount amount may be displayed.

Figure 14:
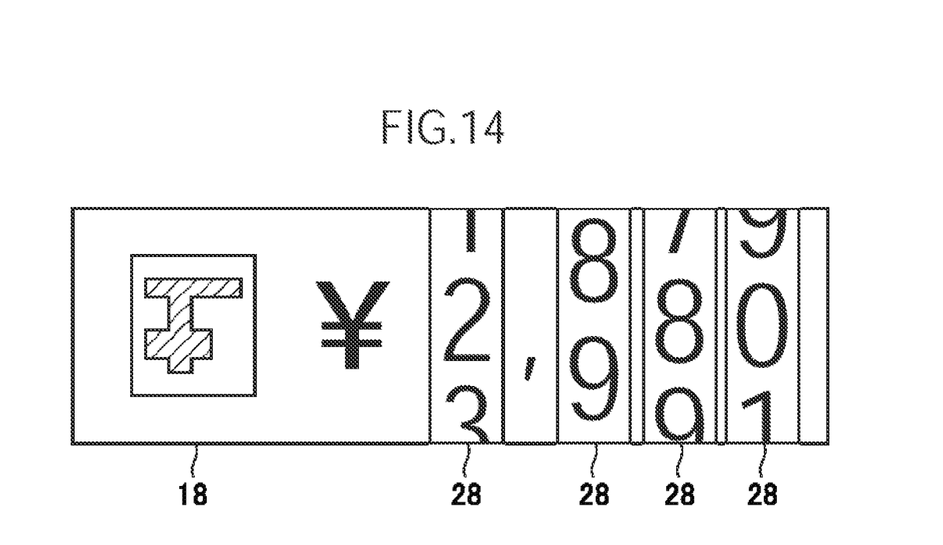
FIG. 14 is a diagram illustrating an animation showing that the price changes.

An animation that shows the price before discount 18b changing to the price after discount 18c may be arranged together in the area of the price before discount 18b in the frame image acquired by the camera 16e. For example, as shown in FIG. 14, a drum-shaped rotating virtual object indicative of figures may be placed in front of the price tag 18 (at the side of the camera 16e), and images 28 of the figures may be displayed. In this way, it is possible to impress upon the customer 14 the point that the price before discount 18b has changed to the price after discount 18c.

Figure 15:
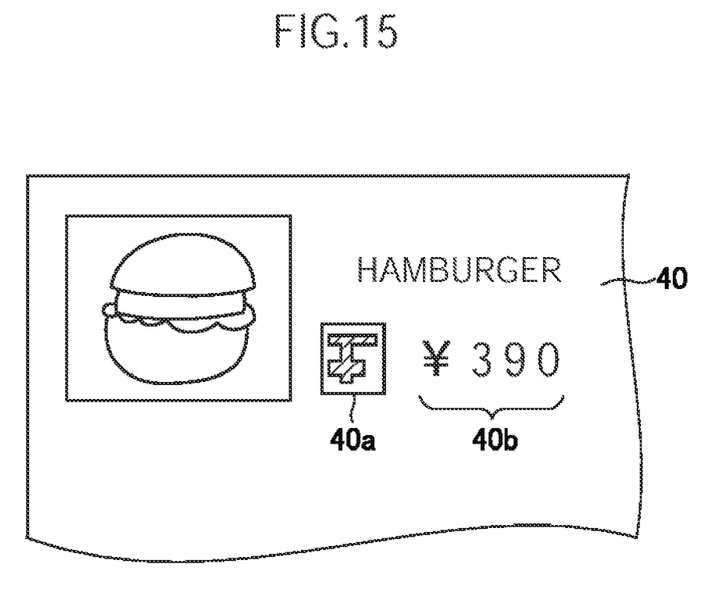
FIG. 15 is a diagram showing an example to apply the present invention to a services purchase supporting system.

The present invention may be applicable not only to an actual store 10 that sells an item 20, but also to an actual store that sells services. For example, as shown in FIG. 15, in an actual store offering food and beverage services, a menu indicating an AR marker 40a and a price before discount 40b is given to a customer. When the customer sees the menu using a goods purchase supporting apparatus to which the present invention is applied, the price before discount 40b may be changed to a price after discount (not shown).

The price after discount included in the coupon table may be dynamically determined by the server 21. For example, the server 21 determines, based on data from the cash register 22, which customer 14 has purchased which item. Further, when the price after discount 18c is arranged together with the image of the price tag 18, the goods and services purchase supporting apparatus 16 notifies the server 21 of the item ID and that the price after discount 18c is displayed. The server 21 may raise or reduce the price after discount included in the coupon table based on a percentage of the number of the customers 14 who have displayed the price after discount 18c, and, among those customers 14, a percentage of the number of the customers 14 who have actually purchased the item.

Although the foregoing describes a case where the item ID is acquired and the positions of price before discount 18b and price before discount 40b are determined based on the AR markers 18a and 40a, an identification marker indicating the item ID and a position reference marker to be referred to when determining the position of the price before discount 18b and price before discount 40b may be represented separately on a medium. In addition, multiple position reference markers may be represented on a medium.

What is claimed is:

1. A goods and services purchase supporting apparatus, including at least one processor, comprising:
  an identification information acquiring unit, within the at least one processor, configured to acquire from a head mounted display unit an image of a view displayed through a display of the head mounted display unit, the image comprising a medium on which an item identification marker indicative of identification information of goods or services and a price of the goods or the services are presented, the price being placed on a predetermined position relative to the item identification marker or a position reference marker, which is different from the item identification marker, the medium being presented through the display of the head mounted display unit to a customer in association with the goods or the services, and the identification information acquiring unit further configured to acquire the identification information from the item identification marker represented on the acquired image of the medium;
  a discount information acquiring unit, within the at least one processor, configured to acquire, from a storing unit configured to store discount information applicable to the goods or the services in association with the identification information of the goods or the services, the discount information that is associated with the identification information acquired by the identification information acquiring unit;

an arranging unit, within the at least one processor, configured to arrange display information, which is based on the discount information acquired by the discount information acquiring unit, together with the image of the medium on a position that is determined based on the position of the item identification marker or the position reference marker and corresponds to the position on which the price is presented; and a display unit configured to display the arranged display information together with the image of the medium through the display of the head mounted display unit, wherein the price is a price before discount, wherein the display information is information indicative of a price after discount, and wherein the arranging unit arranges information indicative of the price after discount on an area of the image of the medium, the area formerly presenting the price before discount.

2. The goods and services purchase supporting apparatus according to claim 1, wherein the arranging unit includes a representation difference determination unit configured to determine a difference between a representation of the price before discount represented on the image of the medium and a representation of the price after discount, and selectively arranges information indicative of the price after discount on a portion of the representation of the price before discount, such that the price after discount is displayed, wherein the portion is related to the determined difference, and wherein the display unit is further configured to display the selectively arranged information indicative of the price after discount on the portion of the representation of the price before discount through the display of the head mounted display unit.

3. A goods and services purchase supporting method, executed by at least one processor, comprising:

acquiring from a head mounted display unit an image of a view displayed through a display of the head mounted display unit, the image comprising a medium on which an item identification marker indicative of identification information of goods or services and a price of the goods or the services are presented, the price being placed on a predetermined position relative to the item identification marker or a position reference marker, which is different from the item identification marker, the medium being presented through the display of the head mounted display unit to a customer in association with the goods or the services, and acquiring the identification information from the item identification marker represented on the acquired image of the medium;

acquiring, from a storing unit configured to store discount information applicable to the goods or the services in association with the identification information of the goods or the services, the discount information that is associated with the acquired identification information;

arranging display information, which is based on the discount information acquired in the step of acquiring the discount information, together with the image of the medium on a position that is determined based on the position of the item identification marker or the position reference marker and corresponds to the position on which the price is presented; and displaying, through the display of the head mounted display unit, the arranged display information together with the image of the medium, wherein the price is a price before discount, wherein the display information is information indicative of a price after discount, and wherein the arranging display information comprises arranging information indicative of the price after discount on an area of the image of the medium, the area formerly presenting the price before discount.

4. A non-transitory information storage medium that stores a program causing a computer to:

acquire from a head mounted display unit an image of a view displayed through a display of the head mounted display unit, the image comprising a medium on which an item identification marker indicative of identification information of goods or services and a price of the goods or the services are presented, the price being placed on a predetermined position relative to the item identification marker or a position reference marker, which is different from the item identification marker, the medium being presented through the display of the head mounted display unit to a customer in association with the goods or the services, and acquire the identification information from the item identification marker represented on the acquired image of the medium;

acquire, from a storing unit configured to store discount information applicable to the goods or the services in association with the identification information of the goods or the services, the discount information that is associated with the acquired identification information;

arrange display information, which is based on the acquired discount information, together with the image of the medium on a position that is determined based on the position of the item identification marker or the position reference marker and corresponds to the position on which the price is presented; and display, through the display of the head mounted display unit, the arranged display information together with the image of the medium, wherein the price is a price before discount, wherein the display information is information indicative of a price after discount, and wherein the arranging display information comprises arranging information indicative of the price after discount on an area of the image of the medium, the area formerly presenting the price before discount.

5. The goods and services purchase supporting apparatus according to claim 1, wherein the arranging unit is further configured to arrange an animation that shows the price before discount changing into the price after discount, together with the image of the medium on the position that is determined based on the position of the item identification marker or the position reference marker and corresponds to the position on which the price is presented, and wherein the display unit is further configured to display the arranged animation together with the image of the medium through the display of the head mounted display unit before displaying the arranged display information.

* * * * *